United States Patent Office 3,372,176
Patented Mar. 5, 1968

3,372,176
ALLYL, HALOALKYL METAL COMPOUNDS
Frank F. Roselli, San Mateo, Calif., assignor to Diamond Shamrock Corporation, a corporation of Delaware
No Drawing. Original application Apr. 15, 1963, Ser. No. 272,882, now Patent No. 3,299,173, dated Jan. 17, 1967. Divided and this application Aug. 29, 1966, Ser. No. 590,129
10 Claims. (Cl. 260—429.5)

ABSTRACT OF THE DISCLOSURE

Compounds of the formula $(R^1O)_aM(OR^2)_b$ wherein M is selected from the group consisting of antimony, titanium, silicon, arsenic, tin, lead and bismuth; $R^1$ is an allyl radical; $R^2$ is a 2,3-dihalopropyl radical; $a$ and $b$ are integers from 1 to 4, inclusive; and $a+b$ is an integer from 3 to 5, are prepared by reacting a stoichiometric amount of halogen with an unsaturated ester of the formula $(R^1O)_{a+b}M$ e.g. triallyl antimonite. The unsaturated ester may be prepared by reacting the corresponding alcohol with a metal halide. The halogenation reaction is preferably carried out in an inert solvent. These compounds are useful as fire-retardant additives in curable polyesters. The olefinic group of the additives participate in the polymerization with the result that the fire-retardant agent is an integral part of the cross-linked resin matrix.

---

This is a division of application Ser. No. 272,882, filed Apr. 15, 1963, now U.S. Patent No. 3,299,173.

This invention relates to improved synthetic resins, and more particularly to curable polyesters characterized by improved physical properties and a high degree of fire-resistance; to methods for the preparation of these polyesters and cross-linked resins derived therefrom; and to novel compounds which are useful as fire-retardant additives therein.

One of the principal difficulties to the expansion of the use of synthetic resin in many applications where they otherwise would be highly desirable has been the flammability of the great majority of these resins. To eliminate this disadvantage, a wide variety of fireproofing additives have been developed. Most of these additives contain one or more of a number of elements noted for their fireproofing properties; these elements include bromine, chlorine, phosphorus, and antimony.

In general, prior fireproofing additives are of two varieties. The first variety is incorporated into the resin as a non-reactive "filler" component. When such an additive is incorporated into a solution of an unsaturated polyester in a liquid monovinyl aromatic compound, it will "separate" or precipitate during the subsequent curing process, thus altering the light-transmitting properties of the cured resin. This phenomenon is particularly disadvantageous in a transparent resin. Other disadvantages are also encountered when a "filler" type additive is used. First, the "dilution" of the resin by the filler may cause a loss in physical strength and hardness. Second, the filler tends to "migrate" to the surface of the resin and undergo hydrolysis when it comes in contact with moist air. The result is a loss of fire-resistant properties in the resin as a whole.

Among the filler-type fireproofing agents in the prior art are alkyl and acyl derivatives of antimonous acid. These compounds are effective as fire-retardants and have a minimum effect on the properties of the resin when the latter contains not more than about 5% by weight of the additive. When the additive constitutes as much as 10-20% of the resin, however, all of the disadvantages described hereinabove are encountered in varying degrees.

Thus, the additive acts as a "filler" and also has some of the characteristics of a plasticizer, with the result that the hardness and strength of the resin are decreased; further, these additives are quite readily extracted from the resin by contacting with water and certain other solvents.

The second variety of fireproofing additive is characterized by its property of reacting with the resin in some way to become part of its molecular structure. The great advantage of this type of additive is, of course, that it avoids most of the difficulties encountered when a "filler" additive is used. Since it is part of the molecular rather than an extraneous ingredient, it cannot "migrate" or be extracted by water or the like; and since it is not a "filler" it can have no "dilution" effect on the physical properties of the resin. However, it will be appreciated that the properties of the resin will depend, to a considerable extent, on its structure, and the reacting additive may, therefore have a deleterious effect.

A principal object of this invention, is to provide improved synthetic resins, especially polyesters, and novel compounds for use as fire-retardant agents in polyester resins.

A further object is to provide fire-retardant agents which can be used in higher percentages in the resin than the agents previously developed.

Another object is to provide reactive fire-retardant additives that can be incorporated into the molecular structure of cross-linked polyester without having an adverse effect on its physical and chemical properties.

Still another object is to provide a fire-resistant polyester resin with improved transparency, hardness and chemical stability.

These and other objects are attained by this invention which comprises certain novel fireproofing additives; methods for their preparation; curable, fire-resistant polyester compositions containing these additives; fire-resistant, cross-linked polyester resins, and methods for their preparation.

THE PRESENT INVENTION

The novel fire-resistant, curable polyester compositions of this invention comprise: (A) about 30–83% by weight of the reaction product of (1) about 2.0–2.5 molar parts of at least one aliphatic polyhydroxy compound, (2) about .4–2.0 molar parts of a compound selected from the group consisting of dibasic carboxylic acids containing a polymerizable double bond and anhydrides thereof, and (3) about 0–1.6 molar parts of a compound selected from the group consisting of non-polymerizable dibasic carboxylic acids and anhydrides thereof; (B) about 15–68% by weight of a solvent for said reaction product, said solvent comprising a monovinyl aromatic compound; and, (C) as a reactive fire-retardant additive, about 2–30% by weight of a compound of the formula

wherein M is selected from the group consisting of antimony, titanium, boron, silicon, arsenic, tin, lead, bismuth and phosphorus; $R^1$ is an aliphatic olefinic radical; $R^2$ is a radical derived from $R^1$ by addition across the olefinic bond of halogen of atomic weight 35–80, inclusive; $a$ and $b$ are integers from 1 to 4, inclusive and $a+b$ is an integer from 3 to 5, inclusive.

Illustrative of the novel compounds which may be used as reactive fire-retardant additives according to this invention are the following:

Allyl bis(2,3-dibromopropyl) antimonite
$CH_2$=$CHCH_2OSb(OCH_2CHBrCH_2Br)_2$
Diallyl 2,3-dibromopropyl antimonite
$(CH_2$=$CHCH_2O)_2SbOCH_2CHBrCH_2Br$ Allyl tetrakis(2,3-dibromopropyl) antimonate
$$CH_2=CHCH_2OSb(OCH_2CHBrCH_2Br)_4$$
Diallyl tris(2,3-dibromopropyl) antimonate
$$(CH_2=CHCH_2O)_2Sb(OCH_2CHBrCH_2Br)_3$$
Allyl tris(2,3-dibromopropyl) titanate
$$CH_2=CHCH_2OTi(OCH_2CHBrCH_2Br)_3$$
Allyl bis(2,3-dibromopropyl) borate
$$CH_2=CHCH_2OB(OCH_2CHBrCH_2Br)_2$$
Allyl tris(2,3-dibromopropyl) silicate
$$CH_2=CHCH_2OSi(OCH_2CHBrCH_2Br)_3$$
Diallyl bis(2,3-dibromopropyl) silicate
$$(CH_2=CHCH_2O)_2Si(OCH_2CHBrCH_2Br)_2$$

The novel compounds of this invention may be prepared by the reaction of the stoichiometric amount of chlorine or bromine with an ester of the formula $(R^1O)_{a+b}M$, wherein $R^1$, $a$ and $b$ are as defined hereinabove. For example, allyl bis(2,3-dibromopropyl) antimonite is prepared by reacting triallyl antimonite with bromine in a mole ratio of 1:2, while diallyl 2,3-dibromopropyl antimonite is prepared from the same reagents in a mole ratio of 1:1. The unsaturated ester starting material is conveniently prepared by reacting the corresponding alcohol with the metal halide, e.g., $SbCl_3$, $SbCl_5$, $TiCl_4$ or $SiCl_4$, preferably in the presence of a "scavenger" such as ammonia or an amine; or by reacting said alcohol with the oxyacid of the metal, e.g., $H_3BO_3$.

The halogenation reaction is desirably, but not necessarily, carried out in an inert solvent; halogenated solvents such as carbon tetrachloride, chloroform, methylene chloride and the like are preferred. Reaction temperatures between about −30° C. and +25° C. are satisfactory; the preferred temperature range is from about 15° C. to about +10° C.

The novel compounds of this invention may often be purified by distillation if desired; however, purification is generally not necessary if the compound is to be used as a fire-proofing additive. Many of these compounds are high-boiling and viscous, and therefore very hard to distill.

The polyesters used in this invention are preferably prepared from at least one aliphatic polyhydroxy compound and a mixture of a dibasic carboxylic acid containing a polymerizable double bond and a non-polymerizable dibasic carboxylic acid. Among the polyhydroxy compounds which may be used are ethylene glycol, propylene glycol, glycerol, and the like. Suitable polymerizable acids include maleic, fumaric, itaconic and citraconic acids and the like; the non-polymerizable acid may be, for example, phthalic, isophthalic, terephthalic, succinic or adipic acid or halogenated derivatives thereof.

The role of the polymerizable acid in the resin mix is, of course, to provide sites for cross-linking. The formed polyester is generally dissolved in a cross-linking agent, usually a monovinyl aromatic compound such as styrene, methylstyrene, vinylpyridine or substituted derivatives thereof. When reaction between the polyester and the cross-linking agent is initiated (for example, by adding a free radical initiator such as benzoyl peroxide), there results a tough, infusible resin.

When the novel fireproofing agents of this invention are added to the polyester-cross-linker mixture and a catalyst is subsequently added, the allyl groups participate in the polymerization. The result is that the cross-linked resin matrix contains, as an integral part thereof, the fire-retardant agent. Thus, adverse effects of a "filler" additive on the physical properties of the resin are avoided, and there is no migration of the additive to the surface and subsequent hydrolysis to impair transparency.

An alternative method for the preparation of a fireproof polyester is to incorporate the novel additives of this invention into the polyester reaction mixture itself, prior to addition of the cross-linker. Generally, about 0.1–0.5 molar part of the additive is used per 2.0–2.5 molar parts of polyhydroxy compound. The terminal hydroxy groups of the growing polyester chain then undergo an exchange reaction with the allyl groups of the additive, and the latter becomes part of the polyester backbone as follows:

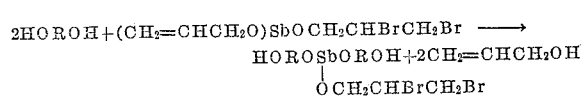

If desired, the additive may be incorporated into the polyester and also into the solution prior to curing, thus providing an extra degree of fire-retardancy.

According to the preferred mode of carrying out this invention, a mixture of polymerizable and non-polymerizable dibasic carboxylic acids or anhydrides thereof, as described hereinabove, is esterified with an aliphatic polyhydroxy compound. The two acids are ordinarily used in approximately equimolar amounts, although an excess of either may be used if desired. Enough polyhydroxy compound is usually employed to provide an excess of about 10–25% over the stoichiometric amount. Alternatively, an excess of acid may be used and the carboxy-terminated polyester may be "capped" with a suitable monohydroxy alcohol, e.g., dibromopropanol.

The polyester formed by the above method is dissolved in the monovinyl aromatic compound, the amount of polyester in the solution usually being about 60–70% by weight. To this solution is added the fireproofing agent, in an amount sufficient to constitute about 2–30% by weight of the final mixture. When the curing is to be effected, a small amount (e.g., about 0.5–1.5% by weight) of a free radical polymerization catalyst (or combination of catalysts) is added and the mass is heated to the temperature necessary for cross-linking.

The flame retardant resins of this invention by means of incorporation of suitable promoters and accelerators for instance cobalt naphthenate and dimethyl aniline are curable at room temperature without loss of properties.

The polyesters of this invention are transparent; their strength is comparable to that of untreated resins; and the effect of water or other solvents on their properties is negligible. These properties are found even in resins containing high percentages of additive. In this respect resins made with the antimony compounds are markedly superior to resins containing prior art antimony additives of the filler type.

The following illustrative examples are given in order that those skilled in the art may achieve a fuller understanding of the invention and the preferred means for effecting the same. All parts and percentages are by weight.

*Example 1*

*Preparation of triallyl antimonite.*—In a two-liter, three-necked flask, placed in an ice-water bath at 5° C. and equipped with mechanical stirrer, reflux condenser, thermometer, drying tube and gas inlet, is placed 228 g. (one mole) of anhydrous antimony trichloride crystals dissolved in 1000 ml. of benzene. To this solution, while stirring vigorously, is rapidly added 255 g. (4.4 moles) of allyl alcohol. A gentle stream of anhydrous ammonia gas is introduced under the surface of the solution. A white precipitate of antimony-amine complex starts separating as a fine suspension while the flask temperature is maintained at less than 10° C. As an excess of ammonia is ascertained by the color change of a piece of litmus paper held on top of the reflux condenser, its flow into the flask is discontinued. The temperature is then raised to 79° C., the reflux temperature of the benzene solution, and this temperature is kept constant for six hours, during which period abundant quantities of ammonia gas are evolved and a crystalline, white precipitate of anhydrous ammonium chloride is formed. The flask is then cooled to room temperature and the precipitate, also containing unreacted antimony trichloride-amine complex, is separated in a nitrogen atmosphere by centrifuging. The filtrate, containing triallyl antimonite is distilled at atmospheric pressure and under nitrogen at 76.8–79° C. to separate the benzene and excess allyl alcohol mixture. The residual of this distillation is a light colored, heavy liquid which hydrolyzes on exposure to the atmosphere. On vacuum distillation of this compound 220 g. (75% of the theoretical amount) of a water-white, heavy liquid is obtained, B.P. 160° C./30 mm. Hg. An elemental analysis of this triallyl antimonite, $C_9H_{15}O_3Sb$, gives the following results:

| Element | Actual percent By Weight | Calculated percent By Weight |
|---|---|---|
| C | 35.5 | 36.9 |
| H | 5.0 | 5.2 |
| Sb | 41.6 | 41.6 |
| O | 16.4 | 16.3 |

*Example 2*

*Preparation of diallyl 2,3-dibromopropyl antimonite.*—In a 1000 ml., three-necked flask equipped with mechanical stirrer, dropping funnel and drying tube, is placed a solution of 58.4 g. (0.2 mole) of triallyl antimonite in 400 ml. of methylene chloride. The flask is cooled to −10° C. and, while stirring, a solution of 32 g. (0.1 mole) of bromine in 100 ml. of methylene chloride is added at the speed of one drop per second. The bromine absorption by the double bond is instantaneous and exothermic. At the end of the bromination, a colorles solution is obtained. The temperature is allowed to rise to 25° C. and stirring is continued for one hour. The solvent is removed by distillation at 20–30° C./100–150 mm. Hg in a nitrogen atmosphere and 90 g. of a very light-colored, liquid residue is obtained which will not distill. This residue has a Gardner-Holdt viscosity of 17 stokes at 25° C.

*Example 3*

*Preparation of allyl bis(2,3-dibromopropyl) antimonite.*—In a one liter, three-necked flask, equipped as for Example 2, is placed a solution of 58.4 g. (0.2 mole) of triallyl antimonite in 400 ml. of methylene chloride. The flask is cooled to −10° C. and, while stirring, a solution of 64 g. (0.4 mole) of bromine in 100 ml. of methylene chloride is added at one drop per second. The bromine color is rapidly eliminated by reaction with the allyl double bond. Distillation of the solvent at 25–30° C./150 mm. Hg in a nitrogen atmosphere leaves 122 g. of a light-colored liquid which will not distill and has a Gardner-Holdt viscosity of 27 stokes at 25° C.

*Example 4*

*Preparation of pentallyl antimonate.*—In a three liter, three-necked flask, equipped as for Example 1, is placed a solution of 150 g. (0.5 mole) of antimony pentachloride in 1500 ml. of n-heptane and 232 g. (4 moles) of allyl alcohol. The flask with its contents is then cooled to 2–3° C. by means of an ice-water bath and a gentle stream of anhydrous ammonia gas is slowly introduced below the surface of the solution while stirring. A finely dispersed, white precipitate of $SbCl_5 \cdot 10NH_3$ starts to form and the solution color turns brown. As an excess of ammonia gas is observed in the solution, its flow into the flask is discontinued and the temperature is slowly raised to reflux. Refluxing is continued for eight hours. A clear brown solution is obtained and the precipitate of ammonium chloride together with the antimony-amine complex is rapidly filtered through coarse filter paper while exposed to the air. No appreciable hydrolysis of the pentallyl antimonate takes place, as compared to the triallyl ester which is readily hydrolyzed. The distillation of heptane and excess allyl alcohol is carried out at 45–50° C./150 mm. Hg in a nitrogen atmosphere. About 120 gm. of a brownish product (80% of the theoretical amount), having a viscosity of 1–2 stokes at 25° C., is obtained. The product contains 29% antimony, as compared with the theoretical amount of 30%.

*Example 5*

*Preparation of diallyl tris(2,3-dibromopropyl) antimonate.*—In a one liter, three-necked flask, equipped as for Example 2 and maintained at 5° C., is placed a solution of 20.3 g. (0.05 mole) of pentallyl antimonate in 300 ml. of methylene chloride; 24 g. (0.15 mole) of bromine dissolved in 200 ml. of methylene chloride is added at one drop per second while stirring. All of the bromine is rapidly absorbed as it is added and a light-colored solution is obtained. The solvent is distilled at 30° C./100 mm. Hg in a nitrogen atmosphere and 44.0 g. of very thick (Gardner-Holdt viscosity of 35–40 stokes at 25° C.), light-brownish material is obtained which is very stable to hydrolysis.

*Example 6*

*Preparation of allyl tetrakis(2,3-dibromopropyl) antimonate.*—In a one liter, three-necked flask, equipped as for Example 2 and maintained at 5° C., is placed 20.3 g. (0.05 mole) of pentallyl antimonate in 300 ml. of methylene chloride; 32 g. (0.2 mole) of bromine in 200 ml. of methylene chloride is added from a separatory funnel at the speed of one drop per second. The bromine color rapidly disappears as it is absorbed and a tan-colored solution is obtained at the end of the bromination. The methylene chloride is distilled off under a nitrogen atmosphere at 30° C./150 mm. Hg. The product, a very thick, dark material, is left at the bottom of the flask. The yield is 52 g.

*Example 7*

*Preparation of tetrallyl titanate.*—One hundred-ninety grams (one mole) of titanium tetrachloride is dissolved in 1000 ml. of cyclohexane and the solution is placed in a two-liter, three-necked flask equipped with mechanical stirrer, reflux condenser, calcium chloride drying tube and gas inlet. Anhydrous ammonia gas is bubbled slowly below the surface of the solution while stirring and the flask temperature is maintained at 5° C. by means of an ice-water bath. A finely dispersed, yellow precipitate indicates the formation of a titanium tetrachloride-ammonia complex. As soon as the presence of an excess of ammonia is ascertained the gas flow is discontinued and the flask temperature is elevated to 25–30° C. A separate four-liter resin kettle, equipped with a mechanical stirrer and reflux condenser and adjacent to the three-necked flask described above, is charged with 400 g. (6.9 moles) of allyl alcohol and brought to boiling temperature by means of a heating mantle. The slurry of titanium tetrachloride-ammonia complex in cyclohexane is slowly transferred by nitrogen pressure through a connecting tube into the resin kettle. Reflux is continued for five hours and then the kettle temperature is allowed to drop to 25° C. The white precipitate of ammonium chloride and excess titanium-ammonia complex is separated by filtration. The cyclohexane solution of tetrallyl titanate is distilled at atmospheric pressure under nitrogen and the solvent with the excess of allyl alcohol distills at 72° C. Toward the end of the solvent distillation a heavy, clear liquid is obtained. To avoid cross-linking of tetrallyl titanate during the vacuum distillation, 1000 parts per million of hydroquinone inhibitor is added. The hydroquinone forms a yellow complex with the product but distillation at 156° C./1 mm. Hg gives a water-white product. The titanium content is 18.5% as compared to a theoretical value of 17.4%.

*Example 8*

*Prepaartion of allyl tris(2,3-dibromopropyl) titanate.*—To 27.6 g. (0.1 mole) of tetrallyl titanate in 300 ml. of methylene chloride, placed in a one liter, three-necked flask equipped as in Example 2, is added at one drop per second, from a separatory funnel, 48 g. (0.3 mole) of bromine dissolved in 200 ml. of methylene chloride. Bromination of the allyl double bond is fast and spontaneous and a light-yellow, clear solution is obtained. The methylene chloride is distilled at 30–35° C./150 mm. Hg and 75 g. of a light-colored, clear product is obtained which has a Gardner-Holdt viscosity of 3.5 stokes at 25° C.

*Example 9*

Preparation of triallyl borate.—A suspension of equimolar amounts of allyl alcohol and boric acid in benzene is heated under reflux; the water formed in the reaction is collected in a Dean & Stark trap. When evolution of water ceases, the benzene is removed by vacuum distillation and the triallyl borate is distilled, B.P. 75–77° C./12 mm. Hg.

*Example 10*

Preparation of allyl bis(2,3-dibromopropyl) borate.—To one mole of triallyl borate, at a temperature between −15° and +10° C., is added two moles of bromine with stirring. The clear product is used without purification in the polyester compositions as described hereinafter.

*Example 11*

Preparation of tetrallyl silicate.—In a 500-ml., three-necked flask, fitted with a mechanical stirrer, reflux condenser and dropping funnel, are placed a solution of 46.4 g. (0.8 mole) of allyl alcohol and 63.3 g. (0.8 mole) of pyridine in 100 ml. of carbon tetrachloride. The solution is stirred and 34 g. (0.2 mole) of silicon tetrachloride is added at such a rate that the mixture is maintained at gentle reflux. After the addition of the silicon tetrachloride, refluxing is continued for one hour.

The white precipitate of pyridine hydrochloride which is formed during the reaction is filtered and weighed in absence of moisture and found to be 78 g., or 84.5% of the theoretical amount. The solvent is distilled at 74–77° C. Upon vacuum distillation of the product, 43 g. of a clear liquid is obtained, B.P. 119° C./17 mm. Hg. This quantity corresponds to 84.4% of the theoretical amount.

*Example 12*

Preparation of allyl tris(2,3-dibromopropyl) silicate.—In a 500 ml., three-necked flask, equipped as for Example 2, is placed a solution of 91 g. (0.36 mole) of tetrallyl silicate in 200 ml. of methylene chloride. A solution of 171 g. (1.08 moles) of bromine in 100 ml. of methylene chloride is slowly added at 3–5° C., while stirring. The bromine color is rapidly dissipated during the addition and a water-white solution is formed. Distillation of the solvent at atmospheric pressure gives 262 g. of a light-colored product which has a viscosity of 1.5 to 2 stokes at 25° C.

*Example 13*

Preparation of diallyl bis(2,3 - dibromopropyl) silicate.—In a 500 ml., three-necked flask, equipped as for Example 2, is placed 51.2 g. (0.2 mole) of tetrallyl silicate in 200 ml. of methylene chloride. A solution of 64 g. (0.4 mole) of bromine in 100 ml. of methylene chloride is added over a period of two hours at 3–5° C., while stirring. Bromine absorption is rapid and exothermic and a water-clear solution is obtained. Distillation of the solvent at atmospheric pressure gives a light-colored compound which has a viscosity of less than 1 stoke at 25° C.

*Examples 14–22*

Part A—Preparation of polyester laminates.—A polyester is prepared from 2.2 moles of propylene glycol, 1.0 mole of fumaric acid and 1.0 mole of phthalic anhydride. To 90 parts of a 65% solution of this polyester in styrene is added 10 parts of a fireproofing additive as indicated in Table I, after which 0.6% of cumene hydroperoxide and 0.5% of benzoyl peroxide are introduced. A 1½ oz., ⅛-inch thick fiberglass mat is impregnated with the resin solution and cured in an oven at 220° F. for two hours. The appearance of the laminates after curing is shown in Table I, column F.

The following tests are carried out on the laminates prepared by the foregoing method, and also on a standard prepared by the same procedure but containing no additive.

Part B—Hardness.—Hardness of cured laminates is measured with a Barcol impressor. This apparatus gives a reading of 85–87 on an aluminum test coupon and 100 on glass. Readings for the coupons prepared according to Part A are given in column B of Table I.

Part C—Water soak & boil tests.—Four 1½-inch square, smooth-edged pieces are cut frm each of the coupons of Part A with a diamond blade saw. One piece is retained as a standard, the second is treated with boiling water for fifteen minutes, the third is boiled for one hour and the fourth is immersed in water at 112° F. for one hour.

The coupons are dried at 60° C. and visual comparison is made as to blooming and "corrosive" effects. The results are given in Column C of Table I.

Part D—Solvent extraction.—A weighed 1½-inch section from each of the laminates of Part A is submerged in 100 ml. of refluxing methanol for two hours and then dried at 200° F. for two hours. The dried coupon is again weighed and percentage weight loss is calculated. Column D of Table I shows the results.

Part E—Burning rate.—A 5½-inch coupon of each laminate is contacted with a Globar heating element at 900° C. for three minutes, according to ASTM method D757–49. The burning rate in inches per minute is reported in Table I, Column E.

*Examples 23–25*

A "high unsaturation" polyester is prepared from 2.2 moles of propylene glycol, 1.33 moles of fumaric acid and 0.67 mole of phthalic anhydride. To a 70% solution of this polyester in styrene is added a fireproofing additive and the tests described hereinabove are performed. Results are given in Table I.

TABLE I

| Example | A Additive | B Hardness | C Soak and Boil | D Extraction | E Burning Rate | F Appearance |
|---|---|---|---|---|---|---|
| 14 | None (control) | 45–49 | Good | 0.07 | 0.72 | Transparent. |
| 15 | Allyl bis(2,3-dibromopropyl)antimonite | 43 | Same as control | 0.89 | 0.505 | Do. |
| 16 | Diallyl 2,3-dibromopropyl antimonite | 45 | ----do---- | 0.035 | 0.537 | Do. |
| 17 | Allyl bis(2,3-dibromopropyl) borate | 48 | | 0.6 | 0.5 | Do. |
| 18 | Allyl tris(2,3-dibromopropyl) silicate | 52 | | 0.34 | 0.5 | Do. |
| 19 | Diallyl bis(2,3-dibromopropyl) silicate | 50 | | 0.214 | 0.49 | Do. |
| 20* | Tris(n-octyl)antimonite | 15 | Opaque | 1.05 | 0.77 | Yellow, non-transparent. |
| 21* | Tris(n-octoxy)antimony dibromide | 0 | Opaque, deteriorated | 11.9 | 0.605 | Transparent. |
| 22* | Antimony cinnamate | 38 | Opaque | 1.7 | 0.69 | Transparent. |
| 23 | Allyl bis(2,3-dibromopropyl)borate, 20% | 40 | | | 0.32 | Do. |
| 24 | Allyl bis(2,3-dibromopropyl)borate, 30% | 35 | | | 0.19 | Do. |
| 25 | None(control) | 53 | | | 0.75 | Do. |

*Prior art additives.

Example 26

*Part A—Preparation of polyester laminate.*—In a resin kettle fitted with a mechanical stirrer, reflux condenser, thermometer and nitrogen inlet are placed 0.89 mole of propylene glycol and 0.4 mole of tetrachlorophthalic anhydride. The kettle is heated to 180° C. and the mixture is allowed to react, with stirring, until an acid value of 11 mg. KOH per gram of resin is attained. Fumaric acid, 0.6 mole, is then added and the reaction is continued at 195° C. until the acid value is 65. The acid value is reduced to 45 by the addition of 0.06 mole of trimethylolethane, and then to 22 by the addition of 0.24 mole of dibromopropanol. The resulting polyester has a viscosity of 4.6 stokes at 25° C. in 30% styrene.

Sixty-seven parts of the polyester prepared as described above is dissolved in 33 parts of styrene. To this solution is added 12 parts of allyl bis(2,3-dibromopropyl)antimonite. The resulting curable polyester is used to prepare translucent fiberglass laminates which are tested by the procedures described below, in comparison with laminates prepared from the same polyester containing no antimonite and from a typical fire-retardant polyester of commerce.

*Part B—Underwriters' laboratories bench test.*—A 12″ x 2″ x 1/16″ fiberglass laminate, prepared according to Part A, is suspended in a vertical position, and the lower end is contacted for thirty seconds with the inner cone of a Bunsen flame at 1300±50° F. The time for which the laminate continues to burn after the flame is removed is measured; this time must be no more than fourteen seconds in order to pass the test. Results are given in Table II.

TABLE II

| Polyester | Burning time, seconds |
|---|---|
| Part A (with additive) | less than 3 |
| Part A—no additive | 108 |
| Commercial product | 12 |

*Part C—"Tunnel Test."*—This test measures flame-spread characteristics of the test specimens in comparison with an asbestos-cement board (rated 0) and a red oak board (rated 100) of identical size. The ratings are classified as follows:

| | |
|---|---|
| Non-combustible | 0 to 25 |
| Fire-retardant | 25 to 50 |
| Slow-burning | 50 to 75 |
| Combustible | 75 to 200 |
| Highly combustible | over 200 |

When tested by this procedure, the polyester prepared according to Part A has a rating of 10. By comparison, a typical fire-retardant polyester of commerce has a rating of 40–75, and ordinary polyester panels have ratings of over 400.

It is to be understood that while the invention has been described with particular reference to specific embodiments thereof, it is not to be so limited, since changes and modifications therein may be made which are within the full intended scope of the invention as defined in the appended claims.

What is claimed is:

1. Compounds of the formula $(R^1O)_aM(OR^2)_b$, wherein M is selected from the group consisting of antimony, titanium, silicon, arsenic, tin, lead, and bismuth; $R^1$ is an allyl radical; $R^2$ is a radical derived from $R^1$ by addition across the olefinic bond of a halogoen of atomic weight 35–80, inclusive; $a$ and $b$ are integers of 1 to 4, inclusive; and $a+b$ is an integer from 3 to 5, inclusive, and equals the valence of M.

2. Compounds of the formula $(R^1O)_nSb(OR^2)_{3-n}$, wherein $R^1$ is an allyl radical; $R^2$ is a radical derived from $R^1$ by addition across the olefinic bond of a halogen of atomic weight 35–80, inclusive; and $n$ is an integer from 1 to 2, inclusive.

3. Allyl bis(2,3-dibromopropyl)antimonite.
4. Diallyl 2,3-dibromopropyl antimonite.
5. Allyl tetrakis(2,3-dibromopropyl)antimonate.
6. Diallyl tris(2,3-dibromopropyl)antimonate.
7. Allyl tris(2,3-dibromopropyl)titanate.
8. Allyl tris(2,3-dibromopropyl)silicate.
9. Diallyl bis(2,3-dibromopropyl)silicate.

10. The method for the preparation of a compound according to claim 1 which comprises reacting $b$ molar parts of a halogen of atomic weight 35–80 with one molar part of a compound of the formula $(R^1O)_{a+b}M$, wherein M is selected from the group consisting of antimony, titanium, silicon, arsenic, tin, lead, and bismuth; $R^1$ is an allyl radical; $a$ and $b$ are integers from 1 to 4 inclusive; and $a+b$ is an integer from 3 to 5, inclusive, and equals the valence of M.

References Cited

UNITED STATES PATENTS

| | | | |
|---|---|---|---|
| 3,189,565 | 6/1965 | Woods et al. | 260—462 X |
| 3,223,755 | 12/1965 | Rimmer | 260—986 |

OTHER REFERENCES

Sommer et al., J. Amer. Chem. Soc., vol. 70, pp. 2872 and 2873 (1948).

Berichte, vol. 9, pp. 486 and 487, (1876).

Berichte, vol. 10, pp. 1655b (July–December 1877).

Berichte, vol. 12, pp. 132a (January–June 1879).

TOBIAS E. LEVOW, *Primary Examiner.*

H. M. S. SNEED, *Assistant Examiner.*